United States Patent Office

2,983,743
Patented May 9, 1961

2,983,743

NEW AND IMPROVED RODENTICIDES

Alexander Galat, 126 Buckingham Road, Yonkers, N.Y.

No Drawing. Filed Nov. 28, 1958, Ser. No. 776,727

30 Claims. (Cl. 260—438)

This invention relates to new and improved rodenticides. In one specific aspect thereof, this invention relates to a method for the purification of 2-acyl 1,3-indandiones. In yet another specific aspect thereof, this invention relates to certain derivatives of 2-acyl 1,3-indandiones and the employment thereof as rodenticides.

The great economic waste occasioned by the depredations of various rodents is well known. Also, in addition to causing injury, destruction or contamination of valuable property and goods, some species of rodents are the usual hosts of vectors of certain human diseases such as bubonic plague, rickettsialpox and, perhaps, murine typhus. Also, rodents themselves harbor and transmit to man the causative organisms of certain diseases such as leptospirosis (Weil's disease), and the like. Accordingly, much effort has been expended in the development of methods and means for the destruction of rodent populations.

The destruction of rodent populations by rapid and direct acting poisons is extremely difficult. Many species of rodents, the rat for example, possess a highly developed native intelligence. Although a voracious feeder, the rat is suspicious of foreign odors and tastes and will reject a poisoned bait unless the presence of poison is undetectable by taste or smell. In attempting to destroy rats by presentation of a bait containing a rapid and direct acting but tasteless and odorless poison, a rat ingesting a sublethal dose of the poisoned bait can be marked down as a survivor of the attempt at destruction for such a rat will not ingest a second portion of the poisoned bait. Also, some rats are capable of attributing symptoms of poisoning to bait that he is ingesting and will frequently cease consumption of such bait before a fatal dose has been taken. Furthermore, there is no doubt that some healthy rats are capable of attributing symptoms of poisoning in other rats to the bait they have been ingesting and will accordingly avoid such bait.

Because of the above mentioned and other deficiencies of rapid and direct acting poisons as rodenticides, in recent years increasing attention has been devoted to the use of comparatively slow acting tasteless and odorless indirect poisons that do not produce any symptoms of poisoning, at least for a considerable period of time. Such materials can be freely ingested by rodents over a comparatively long period of time without producing untoward symptoms in the individual rodent or observable symptoms in his colony companions. As a result, when the more susceptible members of the colony first exhibit symptoms of poisoning all members or practically all members of the colony have already ingested a lethal dose of the indirect poison. These indirect poisons are not poisons in the usual sense of the term but rather are blood anticoagulants. Rodents ingesting such materials continue to gain weight and exhibit no untoward symptoms until just prior to death which occurs in about one to three weeks and is caused by marked hemorrhages, usually of the pleural cavity and lungs, but also observed retroperitoneally and subcutaneously and in the caecum, thymus, eye, and other organs.

One class of rodenticidal anticoagulants embraces the 2-acyl 1,3-indandiones. As set forth in Kilgore, Ford and Wolfe, Industrial and Engineering Chemistry, volume 34, pages 494–497, 1942, such compounds are easily prepared by a Claisen type condensation of a phthalic acid diester and a ketone in the presence of sodium or a sodium alcoholate, conveniently in an aromatic hydrocarbon reaction medium.

A host of 2-acyl 1,3-indandiones are known in the art. Thus, by the condensation of diethyl phthalate with acetone, methyl ethyl ketone, methyl propyl ketone, methyl butyl ketone, methyl amyl ketone, methyl hexyl ketone and the like there is formed, respectively, the 2-acetyl, 2-propionyl, 2-butyryl, 2-valeryl, 2-caproyl and 2-enanthoyl 1,3-indandiones, and the like. Ketones such as methyl isopropyl ketone, methyl isobutyl ketone, methyl t-butyl ketone (pinacolone) and the like give rise, respectively, to 2-isobutyryl, 2-isovaleryl, 2-privaly 1,3-indandiones, and the like. 2-diphenylacetyl 1,3-indandione is similarly obtained using alpha alpha diphenyl acetone as the ketone component of the condensation reaction mixture. Methyl aromatic ketones, methyl alicyclic ketones and methyl heterocyclic ketones react similarly. Condensation of ethyl phthalate (the diester) with acetophenone produces 2-benzoyl 1,3-indanedione; with methyl alpha (or beta) naphthyl ketone, 2-alpha (or beta) naphthoyl 1,3-indandione forms while 2-hexahydrobenzoyl 1,3-indandione is obtained using methyl cyclohexyl ketone. It will be noted that in all instances the ketone component of the condensation mixture has the structure

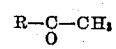

where R is an organic radical, including the methyl radical.

While all of these 2-acyl 1,3-indandiones possess strong anticoagulant properties, those most frequently suggested for use in rodenticidal compositions include 2-pivalyl 1,3-indandione (2-trimethylacetyl 1,3-indandione), 2-diphenylacetyl 1,3-indanedione and 2-isovaleryl 1,3-indandione.

While the 2-acyl 1,3-indandiones are here formulated and named as keto derivatives, this is for convenience only, as there is no doubt that they exist, in part at least, in the enol form, said enol form readily giving rise to metallic and similar salts of these compounds. The infrared spectra of these materials show carbonyl bonds displaced to longer wave lengths than normal and there is a general absorption in the region of 3.3 mu on both sides of the C—H bond, both indicative of hydrogen bonded enols. The ultraviolet absorption of 2-isovaleryl 1,3-indandione (for example) shows a series of high intensity bands at 323, 283, 274 and 237 m. mu, again indicating that this substance exists in enol form. However, for convenience, both the free form and the salt form of these compounds will be named as 2-acyl 1,3-indandiones herein.

The widespread use of 2-acyl 1,3-indandiones in the preparation of rodenticidal compositions has been greatly hindered due to difficulties encountered in the purification of these materials.

As has been mentioned previously rodents, rats for example, are very suspicious of foreign odors and tastes and will reject a bait that possesses an odor or taste that is repugnant and/or does not fall within the previous taste-odor experience of the rodent. It will be noted that the 2-acyl 1,3-indandiones of primary interest here may be considered to be derivatives of phenyl substituted acetic acid or of carboxylic acids having four and five carbon atoms. The disagreeable and persistent odor of such asids is well known. As can be readily established by mere smell, appreciable amounts of material of this type form as a byproduct during the synthesis of 2-acyl 1,3-indandiones and contaminates the crude 2-acyl 1,3-indandiones produced. It would appear that the odor of isovaleric acid, for example, is just as repugnant to rodents as to humans for baits formulated with crude 2-acyl 1,3-indandione in which the acyl group is isovaleryl are completely unacceptable to rodents.

Crude 2-acyl 1,3-indandiones are purified by repeated crystallizations from organic solvents such as benzene, toluene, ether and the like. While this procedure results in low yields and does not give completely odorless products it is the only purification procedure previously available. Application of this purification procedure to crude 2-pivalyl 1,3-indandione produces a reasonably but not entirely satisfactory product as far as odor is concerned but, as would be expected, the repeated crystallizations necessary result in a considerable loss in yield. The prior art clearly shows that a water solution of a so purified 2-pivalyl 1,3-indandione (in the form of its sodium salt) is not as acceptable to rodents as the straight water employed in preparing the bait and this prior art teaches incorporation of certain additional agents with the so purified 2-pivalyl 1,3-indandione in order to increase the rodent acceptability of baits prepared with the so purified material.

Purification by crystallization is even less effective when applied to crude 2-diphenylacetyl 1,3-indandione and is, to all intents and purposes, useless when applied to 2-isovaleryl 1,3-indandione. It is practically impossible to eliminate isovaleric acid and related compounds from 2-isovaleryl 1,3-indandione by this method. Even after the yield of the repeatedly recrystallized product has been reduced almost to the vanishing point, the odor of the impurities still persists and this odor is strongly repulsive to rodents. As a result, baits prepared with such a repeatedly recrystallized product are completely unacceptable to rodents.

The magnitude of the purification problem may be judged by the fact that even though the anticoagulant properties of 2-isovaleryl 1,3-indandione, 2-diphenylacetyl 1,3-indandione and 2-pivalyl 1,3-indandione are of the same order, only 2-pivalyl 1,3-indandione has been used to any extent as an anticoagulant type rodenticide. This is true in spite of the fact that methyl isobutyl ketone, used in the synthesis of 2-isovaleryl 1,3-indandione, costs only 17–18¢ per pound in drums and even less in tank cars while pinacolone, the ketone employed in the synthesis of 2-pivalyl 1,3-indandione, costs about $15 per pound. (Alpha, alpha diphenyl acetone, the ketone employed in the synthesis of 2-diphenylacetyl 1,3-indandione, is available at about the same price as pinacolone.)

I have discovered that crude 2-acyl 1,3-indandiones may be readily purified by first converting the crude material to a multivalent metal salt thereof, for example, an alkaline earth metal such as the calcium salt thereof, forming an alcohol adduct of this salt and separating this alcohol adduct from excess adduct forming solvent by filtration. The separated alcohol adduct may be washed with organic solvents until impurities have been removed and then decomposed to regenerate, as desired, either the multivalent metal salt of 2-acyl 1,3-indandione or the free 2-acyl 1,3-indandione in highly purified and odorless form. Or, if desired, the crystalline alcohol adduct itself may be employed in the formulation of rodenticidal baits.

One object of this invention is to provide a process for the purification of 2-acyl 1,3-indandiones.

Another object of this invention is to provide a process for the purification of 2-isovaleryl 1,3-indandione.

A further object of this invention is to provide a process for the preparation of multivalent metal salts of 2-acyl 1,3-indandiones in highly purified form.

An additional object of this invention is to provide a process for the preparation of multivalent metal salts of 2-isovaleryl 1,3-indandione in highly purified form.

Yet another object of this invention is to provide alcohol adducts of mutlivalent metal salts of 2-acyl 1,3-indandiones.

Still another object of this invention is to provide alcohol adducts of mutlivalent metal salts of 2-isovaleryl 1,3-indandione.

Further objects of this invention will become apparent as the description thereof proceeds.

For the better understanding of this invention, the following example setting forth in detail one specific embodiment thereof is given. As previously mentioned, the problem of purifying 2-isovaleryl 1,3-indandione is particularly difficult and, for reasons already given, a process for the purification of this particular compound would be of great commercial value. Since the process of this invention readily brings 2-isovaleryl 1,3-indandione to the state of purity required for successful use as a rodenticide, the invention will be described principally in connection with the purification of this particular compound although it is to be understood that the applicability of the process of this invention is in no way limited to this particular compound but may be successfully employed for the purification of 2-acyl 1,3-indandiones in general.

*Example 1*

Fifty-four grams sodium methoxide, 194 g. dimethyl phthalate, 105 g. methyl isobutyl ketone and 450 ml. benzene were refluxed for eight hours. The benzene was removed by distillation under vacuum and the residue was treated with 500 ml. hot water and the supernatant liquid decanted. On cooling, this liquid deposited the sodium salt of 2-isovaleryl 1,3-indandione in a crude state. This salt was separated by filtration, washed with a small amount of water and treated with one liter of hot water. The resulting mixture was combined with a solution of 115 g. calcium chloride in 350 ml. hot water and the precipitated dark, gummy, amorphous calcium salt resulting was separated by filtration, washed with hot water and dried. Dry weight, 200 g.

This crude calcium salt was heated with 320 ml. methyl Cellosolve (ethylene glycol monomethyl ether) and the resulting solution alowed to crystallize. The crystalline adduct was separated by filtration and was washed with methyl Cellosolve until all colored and odorous impurities had been completely removed. The pure adduct was dried at 50–60° C. It weighed 191 g. and was odorless.

This adduct is composed of one mole of the calcium salt of 2-isovaleryl 1,3-indandione and one mole of methyl Cellosolve, as indicated by spectrophotometric analysis and by the results of treating this adduct with water and with acid. Spectrophotometric analysis of the adduct indicates that calcium 2-isovaleryl 1,3-indandione comprises 80% of the whole. (Theory, 81%, assuming the adduct being comprised of the salt and the alcohol in 1:1 molecular proportion.)

A 191 g. portion of pure adduct was heated with 500 ml. of water whereupon the bright yellow crystals changed to an orange non-crystalline powder. This was filtered, washed with hot water and dried. The yield of dried material was 160 g. This product, the calcium salt of 2-isovaleryl 1,3-indandione, showed no further loss in weight when boiled with an excess of water thus indicating that the water soluble portion of the adduct (methyl Cellosolve) amounts to 16.2% by weight of the adduct.

Another 191 g. portion of pure adduct was converted to pure 2-isovaleryl 1,3-indandione in the following manner: The adduct was dissolved in 400 ml. hot methanol and the resulting solution was treated with 200 ml. concentrated hydrochloric acid. The free 2-isovaleryl 1,3-indandione separated as an oil which soon solidified. Two liters of water were added and the methanol boiled off. The mixture was allowed to cool, the solid acyl indandione was separated by filtration, washed with water and dried. The yield of dried material was 135.3 g. or 71% based on the weight of the adduct. The theoretical yield is 70.6%, assuming the adduct is composed of one mole methyl Cellosolve and one mole calcium 2-isovaleryl 1,3-indandione, and is thus in close agreement with the actual yield. The purified acyl indandione melted at 68–69° C. (Literature value, 67–68° C.)

While the above example describes the conversion of the pure alcohol adduct to the multivalent metal salt of 2-isovaleryl 1,3-indandione or pure 2-isovaleryl 1,3-indandione itself, such a conversion may be dispensed with if desired since the pure adduct may itself be employed in the formation of rodenticidal baits. Rodenticidal baits prepared with the pure adduct are completely acceptable to rodents as are baits prepared from free 2-isovaleryl 1,3-indandione that has been purified through adduct formation and decomposition as previously described.

While the above example describes the preparation of an alcohol adduct of the calcium salt of 2-isovaleryl 1,3-indandione, salts formed with other multivalent metals form similar alcohol adducts which are equally suitable for use in the purification process previously described. Thus, the brick red ferrous salt, the brilliant emerald green cupric salt, and the like, of 2-isovaleryl 1,3-indandione form alcohol adducts which permit the ready removal of impurities found associated with crude 2-isovaleryl 1,3-indandione.

Also, while methyl Cellosolve is employed as the alcohol in forming the adduct of the previous example, alcohols as a class form adducts with multivalent metal salts of 2-acyl 1,3-indandiones which are crystalline compounds eminently suited for the purification of the corresponding acyl indandiones. However, solubility and certain other considerations point to some alcohols as being more suitable than others in forming adducts of the nature and for the purposes set forth herein.

Thus, while calcium 2-isovaleryl 1,3-indandione forms an excellent crystalline adduct with methanol, this adduct is very soluble in methanol at room temperature and is accordingly rather difficult to recover in high yield by crystallization from an excess of this adduct forming solvent. Contrariwise, the isopropanol/calcium 2-isovaleryl 1,3-indandione adduct is quite insoluble in isopropanol, both at room temperature and at the boiling point of isopropanol. As a result, an inordinately large excess of isopropanol must be employed in order to effect an efficient crystallization (and, accordingly, an efficient purification) of this particular alcohol adduct. Ethanol occupies a more or less intermediate position between methanol and isopropanol as regards to behavior as an adduct forming alcohol.

Glycols, such as ethylene glycol, propylene glycol and the like, give well crystallized adducts with multivalent metal salts of 2-acyl 1,3-indandiones but these adduct forming alcohol solvents are somewhat inconvenient to handle and use because of their hygroscopic character, rather high viscosity and high boiling point.

While alcohols and alcohol type solvents form adducts with multivalent metal salts of 2-acyl 1,3-indandione which are suitable for use in the process of the present invention, it is obvious from the previous discussion that some of these are superior to others for the purposes of the present invention. The relative suitability of various alcohols is determined not only by the nature of the 2-acyl 1,3-indandione involved but also by the nature of the multivalent metal salt that is employed. Thus, while for reasons previously given, methanol is not too well suited for use in connection with calcium 2-isovaleryl 1,3-indandione in the process of this invention, methanol is very suitable for use in conection with cupric 2-isovaleryl 1,3-indandione since methanol forms an adduct with this particular salt that is easily crystallized and is very sparingly soluble in methanol at room temperature.

While this invention has been described almost exclusively in connection with the purification of 2-isovaleryl 1,3-indandione, as previously explained this is for the reason that the purification of this particular compound with the production of an odorless, rodent acceptable product has been extremely difficult or even impossible to achieve by prior art purification methods. However, the process of this invention is equally suitable for the purification of other 2-acyl 1,3-indandiones such as 2-pivalyl 1,3-indandione, 2-diphenylacetyl 1,3-indandione, and the like.

Also, while this invention has been exclusively described in connection with use of 2-acyl 1,3-indandiones purified by the process thereof in the formulation of rodenticidal baits, it is not limited thereto. As is well known, 2-acyl 1,3-indandiones have pronounced insecticidal properties and certain 2-acyl 1,3-indandiones are being investigated for use in connection with humans where a temporary and controlled increase in the clotting time of the blood stream is desired to correct for certain patholigical conditions.

Be it remembered that while this invention has been described in connection with a specific example and specific details thereof, these are illustrative only and are not to be considered limitations on the spirit or scope of said invention except in so far as these may be incorporated in the appended claims.

I claim:

1. Process for the preparation of new compositions of matter including: forming a multivalent metal salt of a crude 2-acyl 1,3-indandione, dissolving said multivalent metal salt in an alcohol whereby an alcohol adduct of the multivalent metal salt is formed, crystallizing the resulting solution to precipitate the alcohol adduct in solid form, separating the solid alcohol adduct from the mother liquor and washing the solid alcohol adduct with an organic solvent to remove impurities originally associated with the crude 2-acyl 1,3-indandione whereby the solid alcohol adduct of the multivalent metal salt of the 2-acyl 1,3-indandione is obtained in essentially pure form.

2. The process of claim 1 in which said 2-acyl 1,3-indandione is 2-pivalyl 1,3-indandione.

3. The process of claim 1 in which said 2-acyl 1,3-indandione is 2-diphenylacetyl 1,3-indandione.

4. The process of claim 1 in which said 2-acyl 1,3-indandione is 2-isovaleryl 1,3-indandione.

5. The process of claim 1 in which the said multivalent metal salt is calcium 2-isovaleryl 1,3-indandione.

6. The process of claim 1 in which said alcohol adduct is methyl Cellosolve/calcium 2-isovaleryl 1,3-indandione.

7. The process of claim 1 in which said multivalent metal salt is cupric 2-isovaleryl 1,3-indandione.

8. The process of claim 1 in which said alcohol adduct is methanol/cupric 2-isovaleryl 1,3-indandione.

9. Process for the purification of 2-acyl 1,3-indandiones including: forming a multivalent metal salt of a crude 2-acyl 1,3-indandione, dissolving said multivalent metal salt in an alcohol whereby an alcohol adduct of the multivalent metal salt is formed, crystallizing the resulting solution to precipitate the alcohol adduct in solid form, separating the solid alcohol adduct from the mother liquor, washing the solid alcohol adduct with an organic solvent to remove impurities originally associated with the crude 2-acyl 1,3-indandione and finally decomposing the washed alcohol adduct with acid to regenerate the free 2-acyl 1,3-indandione in purified form.

10. The process of claim 9 in which said 2-acyl 1,3-indandione is 2-pivalyl 1,3-indandione.

11. The process of claim 9 in which said 2-acyl 1,3-indandione is 2-diphenylacetyl 1,3-indandione.

12. The process of claim 9 in which said 2-acyl 1,3-indandione is 2-isovaleryl 1,3-indandione.

13. The process of claim 9 in which said multivalent metal salt is calcium 2-isovaleryl 1,3-indandione.

14. The process of claim 9 in which said alcohol adduct is methyl Cellosolve/calcium 2-isovaleryl 1,3-indandione.

15. The process of claim 9 in which said multivalent metal salt is cupric 2-isovaleryl 1,3-indandione.

16. The process of claim 9 in which said alcohol adduct is methanol/cupric 2-isovaleryl 1,3-indandione.

17. Alcohol adducts of multivalent metal salts of 2-acyl 1,3-indandiones.

18. Alcohol adducts of multivalent metal salts of 2-pivalyl 1,3-indandione.

19. Alcohol adducts of multivalent metal salts of 2-diphenylacetyl 1,3-indandione.

20. Alcohol adducts of multivalent metal salts of 2-isovaleryl 1,3-indandione.

21. The methyl Cellosolve/calcium 2-isovaleryl 1,3-indandione adduct.

22. The methanol/cupric 2-isovaleryl 1,3-indandione adduct.

23. Process for the purification of 2-acyl 1,3-indandiones including: forming a multivalent metal salt of a crude 2-acyl 1,3-indandione, dissolving said multivalent metal salt in an alcohol whereby an alcohol adduct of the multivalent metal salt is formed, crystallizing the resulting solution to precipitate the alcohol adduct in solid form, separating the solid alcohol adduct from the mother liquor, washing the solid alcohol adduct with an organic solvent to remove impurities originally associated with the crude 2-acyl 1,3-indandione and finally decomposing the washed alcohol adduct with water to regenerate the multivalent metal salt of the 2-acyl 1,3-indandione in purified form.

24. The process of claim 23 in which said crude 2-acyl 1,3-indandione is 2-pivalyl 1,3-indandione.

25. The process of claim 23 in which said crude 2-acyl 1,3-indandione is 2-diphenylacetyl 1,3-indandione.

26. The process of claim 23 in which said crude 2-acyl 1,3-indandione is 2-isovaleryl 1,3-indandione.

27. The process of claim 23 in which said multivalent metal salt is calcium 2-isovaleryl 1,3-indandione.

28. The process of claim 23 in which said alcohol adduct is methyl Cellosolve/calcium 2-isovaleryl 1,3-indandione.

29. The process of claim 23 in which said multivalent metal salt is cupric 2-isovaleryl 1,3-indandione.

30. The process of claim 23 in which said alcohol adduct is methanol/cupric 2-isovaleryl 1,3-indandione.

References Cited in the file of this patent

UNITED STATES PATENTS

| | | |
|---|---|---|
| Re. 23,080 | Eck | Jan. 25, 1949 |
| 2,837,571 | Conover | June 3, 1958 |
| 2,880,132 | Schwarz | Mar. 31, 1959 |